UNITED STATES PATENT OFFICE.

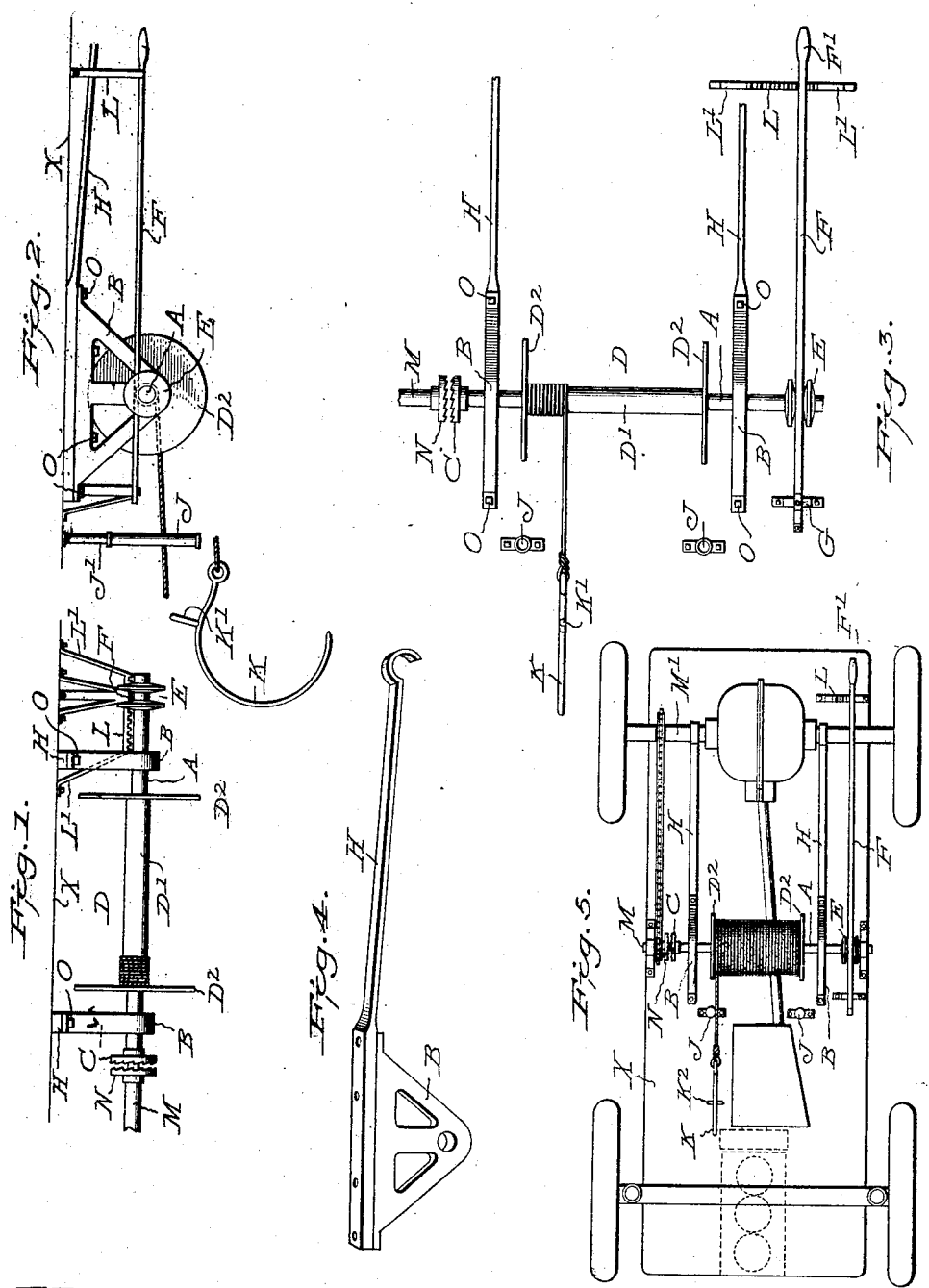

BENJAMIN J. FRENCH, OF BRIGHTON, COLORADO, ASSIGNOR OF ONE-HALF TO EMMET A. BROMLEY, OF BRIGHTON, COLORADO.

POWER DEVICE FOR MOVING AUTOMOBILES.

No. 891,767.      Specification of Letters Patent.      Patented June 23, 1908.

Application filed October 1, 1907. Serial No. 395,421.

*To all whom it may concern:*

Be it know that I, BENJAMIN J. FRENCH, a citizen of the United States of America, residing at Brighton, county of Adams, and State of Colorado, have invented a new and useful Power Device for Moving Automobiles, Traction-Engines, and the Like out of Stalled and Lodged Positions, of which the following is a specification.

My invention relates to a power device for moving automobiles and traction engines out of stalled and lodged positions; and the object of my invention is: to provide a simple, inexpensive, and powerful anchored-cable winding mechanism that can be permanently attached if desired to the bottoms of automobiles or traction engines, or if preferred be carried by automobiles and traction engines and be arranged and adapted to be quickly attached to them and to their motive power when they are lodged or stalled in deep rut holes and cave-ins on roads or become disabled or broken down in a road, and it is necessary to move them. I attain these objects by the mechanism illustrated in the accompanying drawings, in which:

Figure 1, is an end elevation of my power pulling device. Fig. 2, is a side view of Fig. 1. Fig. 3, is a plan view of Figs. 1 and 2. Fig. 4, is a perspective view of one of the drum shaft bearings and one of the draw bars. And Fig. 5, illustrates the application of my invention to an automobile.

Similar letters of reference refer to similar parts throughout the several views.

Referring to the drawings, the letter A designates the winding drum shaft of my power pulling device. This shaft is rotatably journaled in bracket hanger boxes B, which are preferably V-shaped, and their upper edges are adapted to be bolted to the under side of the floor X, or other suitable portion of an automobile or a traction engine, at right angles to its length or direction of motive travel, and in a suitable position to be coupled to the motive power of the vehicle. This main shaft extends beyond the hanger boxes at its opposite ends, and upon one end a half part C of any suitable clutch coupling is secured, and upon its opposite end a shaft shifter collar E is secured. This shifter collar is engaged by a shifter lever F, which is pivotally secured at one end to a bracket G, which is secured to the bottom of the vehicle at a short distance beyond the shifter collar, and its opposite end portion, which is provided with a handle portion $F^1$, is adjustably secured in a toothed bar L, which is provided with end arms $L^1$ that are secured to the bottom of the vehicle.

The clutch shifter lever has a sweeping movement along this toothed bar sufficient to move the drum shaft to couple with or uncouple from a shaft M, connected with the motive power shaft $M^1$, of the vehicle, the adjacent end of which is also provided with a half part clutch coupling N. The vehicle motive shaft M, to which the shaft of the rope drum couples, may be the main driving shaft of the motor of the automobile or other vehicle, or it may be a supplementary or auxiliary or a counter shaft operatively connected to the motor shaft of the vehicle, and arranged to rotate with suitable reduced speed and the increased power required to move the size and weight of vehicle to which the anchor rope-winding drum is attached, and this counter shaft is positioned in the most desirable position to connect to the winding drum shaft.

Upon the winding drum shaft I secure a winding drum D, which comprises a spool portion $D^1$, having end flanges $D^2$. Upon this drum is wound a wire rope, which may be of any desired practical length for the purpose in view, about three hundred feet of rope being sufficient, but more or less can be used as desired. One end of this rope is secured to the drum, and the opposite end is provided with a large anchor hook K, suitable for hooking a tree, fence post, stump, or rock, or other natural or provided anchoring object, which happens to be the most convenient to the vehicle. A handle $K^1$ is preferably placed on the back of the hook adjacent to its rope attaching end for convenience in handling and placing the hook. I preferably attach two rope guide rollers J to the bottom of the vehicle, placing them in alinement with the opposite ends of the spool to guide the rope between the flanges of the drum to the ends of its spool. These rollers are mounted on depending rods $J^1$, which are secured at their upper ends to the bottom of the vehicle. To the bracket journal box hangers and to the vehicle, preferably between the joint between hanger and the bottom portion of the vehicle, I secure two draw bars H, preferably using for this purpose the same bolts O, that I employ to bolt the hanger to the vehicle, and extend these bolts O through apertures formed in the draw bars. These draw bars are thus rigidly secured at one end to the body of the vehicle, and at their opposite ends they extend to and are secured in any suitable manner to the rear axle of the vehicle, but preferably by securely hooking their ends to the axle.

The operation of my motor vehicle rope pulling device is as follows: The rope is preferably wound on the drum from the forward end of the vehicle, and the hook and rope are unwound towards and carried beyond the front end of the vehicle, usually to the nearest or most suitable anchoring object the hook can be applied to. In case, however, it is more desirable to back a vehicle out of a rut or hole, or to move a broken down vehicle out of a road, the hook and rope can be run out from the under side of the drum towards and beyond the rear or hind end of the vehicle and be secured to the most desirable anchor object to be found in the vicinity of the vehicle. The chauffeur or engineer then starts his vehicle motor, and throws it into gear with the shaft of the winding drum by moving the shifter lever F to couple the drum shaft. The winding drum will then commence to rotate and will wind the rope up and pull the car out of its lodged position to or as far toward the anchor object as desired.

Having pulled the vehicle out of its lodged position, the rope is wound up on the drum, and the hook hung up on the vehicle where it will be secure against accidental displacement, a hook $K^2$ being provided on the vehicle for this purpose, on which the handle is hung, and then the drum's shaft is uncoupled from the vehicle's motor mechanism by moving the shifter rod to uncouple the drum shaft from the motor shaft.

My invention is simple, and can be built on motor vehicles at the time they are constructed in the factory, or can be attached to those already in use.

My invention contemplates broadly the application of a power-driven anchor rope winding drum and its operative mechanism to automobiles or traction engines.

Having described my invention, what I claim as new and desire to secure by Letters Patent is:

1. In a device as specified, the combination with a vehicle having a motor-driven shaft, of draw bars secured to the vehicle at one end, their opposite ends being hooked to engage the said shaft; bearings upon said draw bars; a shaft slidably mounted in the bearings, having a clutch on one end; a shaft having a clutch in line with the first mentioned clutch; a sprocket wheel on said shaft, a sprocket wheel on the motor-driven shaft, and a chain connecting said sprocket wheels; a drum on the slidable shaft; a cable on said drum having an anchor upon its free end; depending guide rollers secured to the vehicle adjacent to the drum; disks secured upon the slidable shaft; a lever pivoted at one end and extending between said disks, for shifting said shaft, and means for holding said shaft either in an operative or an inoperative position, relatively to the power driven clutch.

2. In a power device for moving lodged motor driven vehicles, the combination with an automobile or traction engine, provided with a motor driven shaft, of hanger journal boxes attached to said vehicle, a driven shaft journaled in said hanger boxes and provided with a clutch coupling member at one end, a clutch connected with said motor driven shaft, a clutch shifter lever arranged to move said drum shaft and its clutch member into engagement with said motor driven clutch member, a rope winding drum secured to said drum shaft, a rope secured at one end to said drum and adapted to be wound thereon, an anchor hook on the free end of said rope, and draw bars secured to said hangers and to said vehicle at one end and to the rear axle of said vehicle at their opposite ends.

3. In a power device for moving automobiles out of stalled or lodged positions, the combination with an automobile, and its motor driven axle, of a rope winding drum rotatably mounted on said automobile, a clutch arranged on said drum, a clutch in operative relation to said drum clutch, and connected to said motor driven axle, a clutch operating lever arranged to move said clutch and drum to connect with said motor driven clutch, a rope connected at one end to said drum, a hook at the free end of said rope, and draw bars connected at one end to said hangers and the body portion of said automobile and extending to and secured to the rear axle of said automobile.

In testimony whereof I affix my signature in presence of two witnesses.

BENJAMIN J. FRENCH.

Witnesses:
DAVID SCHOONMAKER,
R. T. COLE.